United States Patent

Huang

[11] Patent Number: 6,096,206
[45] Date of Patent: Aug. 1, 2000

[54] MANUFACTURING EQUIPMENT FOR DRINKABLE WATER CONTAINING HIGH OXYGEN

[76] Inventor: Wen-Tien Huang, No.308, Chu-Liao Road., Ta-Shu Village, Kaohsiung Hsien, Taiwan

[21] Appl. No.: 09/206,700

[22] Filed: Dec. 7, 1998

[51] Int. Cl.[7] .................................................. C02F 9/00
[52] U.S. Cl. ...................... 210/202; 210/203; 210/259; 210/314
[58] Field of Search .................... 210/202, 203, 210/259, 295, 314, 900, 760, 758; 222/189.06, 189.09

[56] References Cited

U.S. PATENT DOCUMENTS

| | | | |
|---|---|---|---|
| 3,870,033 | 3/1975 | Faylor et al. ........................... | 210/900 |
| 4,343,776 | 8/1982 | Carr et al. ............................... | 423/210 |
| 5,059,317 | 10/1991 | Marius et al. ........................... | 210/202 |
| 5,259,972 | 11/1993 | Miyamaru et al. ..................... | 210/900 |
| 5,512,178 | 4/1996 | Dempo ................................... | 210/638 |
| 5,997,752 | 12/1999 | Leu et al. ................................ | 210/760 |

*Primary Examiner*—David A. Simmons
*Assistant Examiner*—Frank M. Lawrence
*Attorney, Agent, or Firm*—Dougherty & Troxell

[57] ABSTRACT

Manufacturing equipment for drinkable water containing high oxygen includes at least an original water storing and feeding device, a filter device, a softening device, a deodorising device, a film filter device, a collecting and reacting device, an ozone sterilizing device, a sophisticated filter device, a liquid oxygen supply device, and a dispensing device combined together for producing the best quality drinkable water.

2 Claims, 5 Drawing Sheets

MANUFACTURING EQUIPMENT FOR DRINKABLE WATER CONTAINING HIGH OXYGEN

BACKGROUND OF THE INVENTION

This invention relates to manufacturing equipment for drinkable water, particularly to one complete in treating water to contain high oxygen.

Nowadays, mineral water or drinkable water canned or bottled comes from unpolluted sources in mountains or upper portions of streams. No matter what source water may come from, drinkable water should go through proper treatment, including sterilization, filtering, etc. In other words, no matter what source water may come from, it has to be treated to become healthful water, or so called pure water, and manufacturing equipment leaves much space to be developed to produce better drinkable water.

SUMMARY OF THE INVENTION

The purpose of the invention is to offer manufacturing equipment for drinkable water containing high oxygen.

The feature of the invention is an original (untreated) water storing and feeding device, a filter device, a softening device, a deodorising device, a collecting and reacting device, an ozone sterilizing device, a sophisticated filter device, a dispensing device, and a liquid oxygen supply device combined together for producing and supplying the best quality water according to different demands. In addition, a reverse penetrating film device is provided between the deodorising device and the filtering device for screening the organic, inorganic, or any substance harmful to a human body in a sophisticated way.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
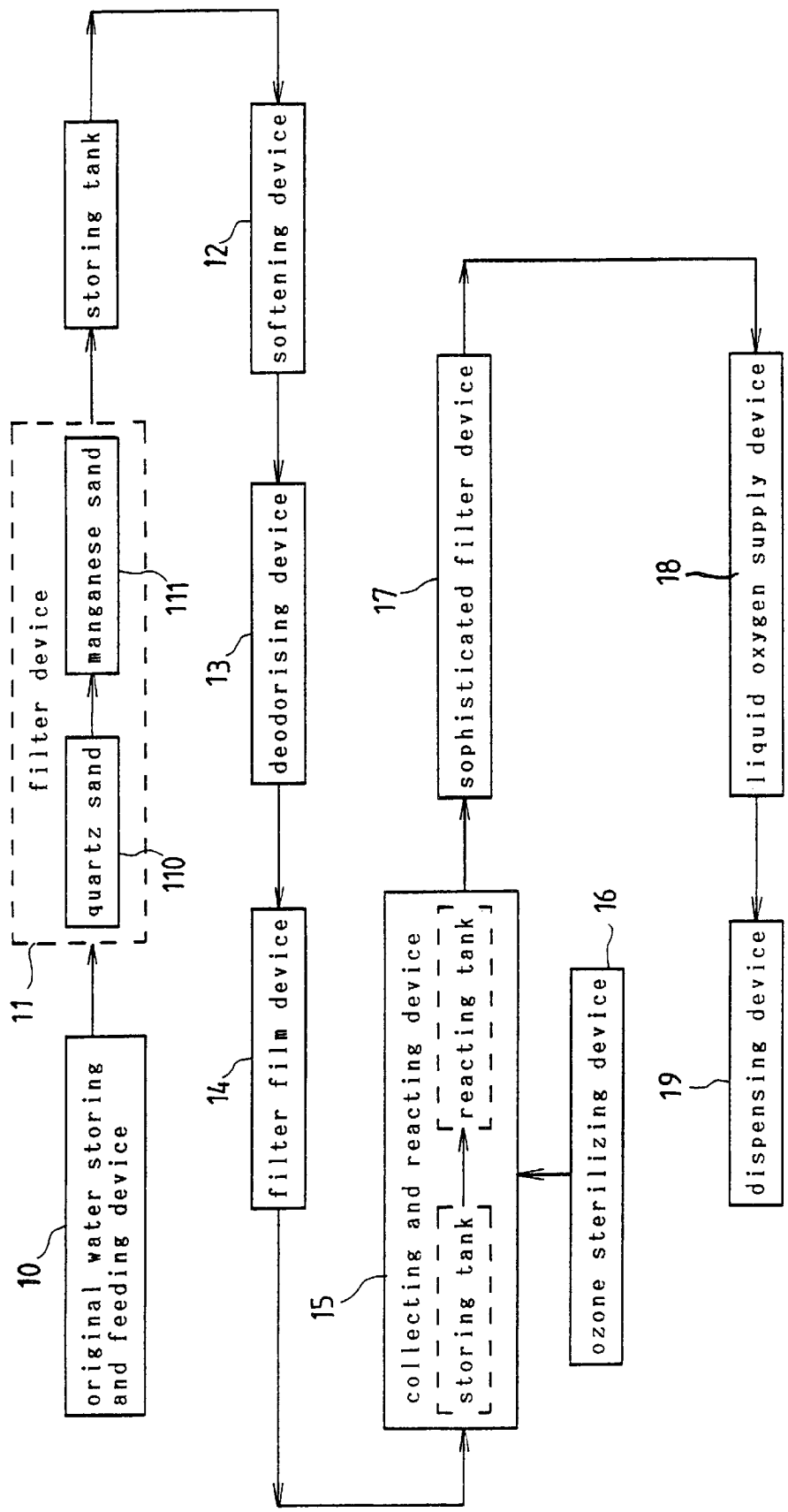
FIG. 1 is a flow chart of a first embodiment of manufacturing equipment for drinkable water containing high oxygen in the present invention.

A first embodiment of manufacturing equipment for drinkable water containing high oxygen in the present invention, as shown in FIG. 1, includes an original (untreated) water storing and feeding device 10, a filter device 11, a softening device 12, a deodorising device 13, a film filter device 14, a collecting and reacting device 15, an ozone sterilizing device 16, a sophisticated filter device 17, a liquid oxygen supply device 18, and a dispensing device 19 combined together orderly.

The original (untreated) water storing and feeding device 10 is a container for storing river water, stream water, underground water, etc. to be fed to the next filter device 11.

The filter device 11 is to filter dirt, calcium, iron, other heavy metals such as arsenic, cadmium, mercury, lead, silver etc. by means of filtering material made of quartz sand 110 or manganese sand 111, or made of both the materials used at the same time.

The softening device 12 connected the filtering device 11, contains softening material such as resin to soften hard water tasted astringent into soft water tasted slippery.

The deodorising device 13 connected to the softening device 12, contains deodorising material such as active carbon to get rid of odor in water.

Figure 2:
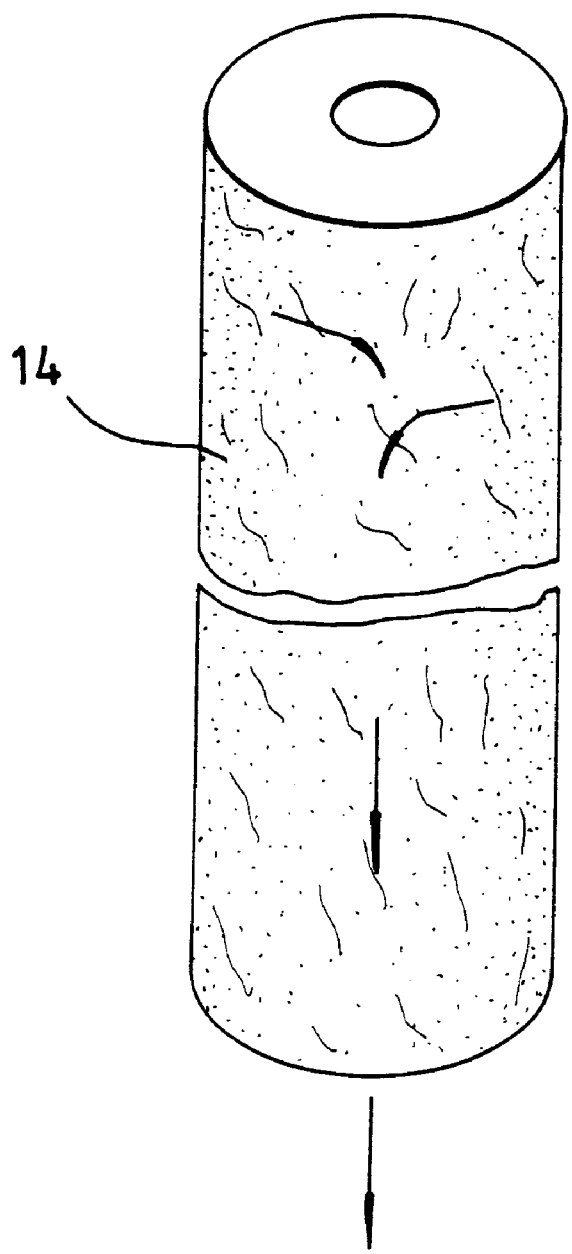
FIG. 2 is a perspective view of a film filter device in the present invention.

The film filter device 14 connected to the deodorising device 13, as shown in FIG. 2, has filter films with very tiny pores for getting rid of the organic, tea, or coffee dregs mixed in the water to be treated. This device may carry out ultrafiltration, provided with a large number of pores of 10–200 A (angstrom) diameter, mainly utilizing capillary phenomenon to filter extremely tiny miscellaneous substances from water to be treated so as to enhance water quality.

The collecting and reacting device 15 connected to the film filter device 14, collects water coming from the film filter device 14.

The ozone sterilizing device 16 is used to pour ozone in a preset volume into the collecting and reacting device 15, permitting ozone staying therein enough time to sterilize the water so that ozone having a strong volatility may resolve in water to become oxygen, thus given the water a high oxygen content as well as performing a good sterilizing function. As ozone revolves in water easily under comparatively low temperature, the collecting and reacting device 15 preferably has an inner temperature in the range of 0° C.–30° C.

The sophisticated filter device 17 connected to the water collecting and reacting device 15, has filter material with extremely tiny pores, as shown in FIG. 2, filtering extremely tiny substances by means of capillary phenomenon when moving through a filter net tube, once again elevating water quality. Further, filtering material for the sophisticated filtering device is preferably of stainless steel or other very thin film of anti-corrosive quality and with a large number of pores of about 100 angstrom diameter.

Figure 3:
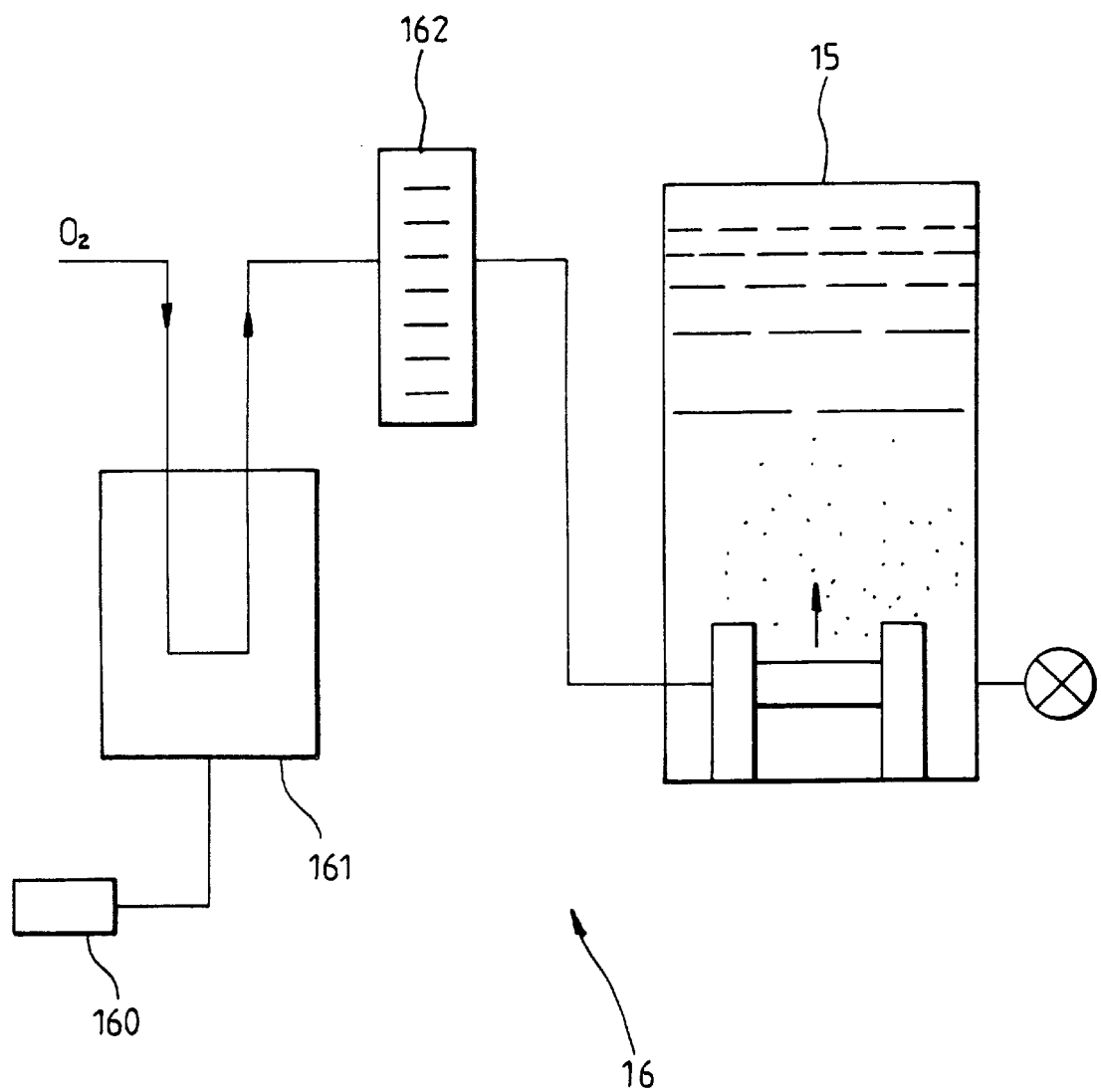
FIG. 3 is a structural view of an ozone sterilizing device in the present invention.

The ozone sterilizing device 16 has the structure shown in FIG. 3, consisting of an ozone producer 161 to decompose oxygen into ozone, a power source 160, and a volume controller 162 to feed a definite volume of ozone into the water in the collecting and reacting device 15, permitting an ozone, sterilizing effect and increasing the volume of oxygen contained in the water.

Figure 4:
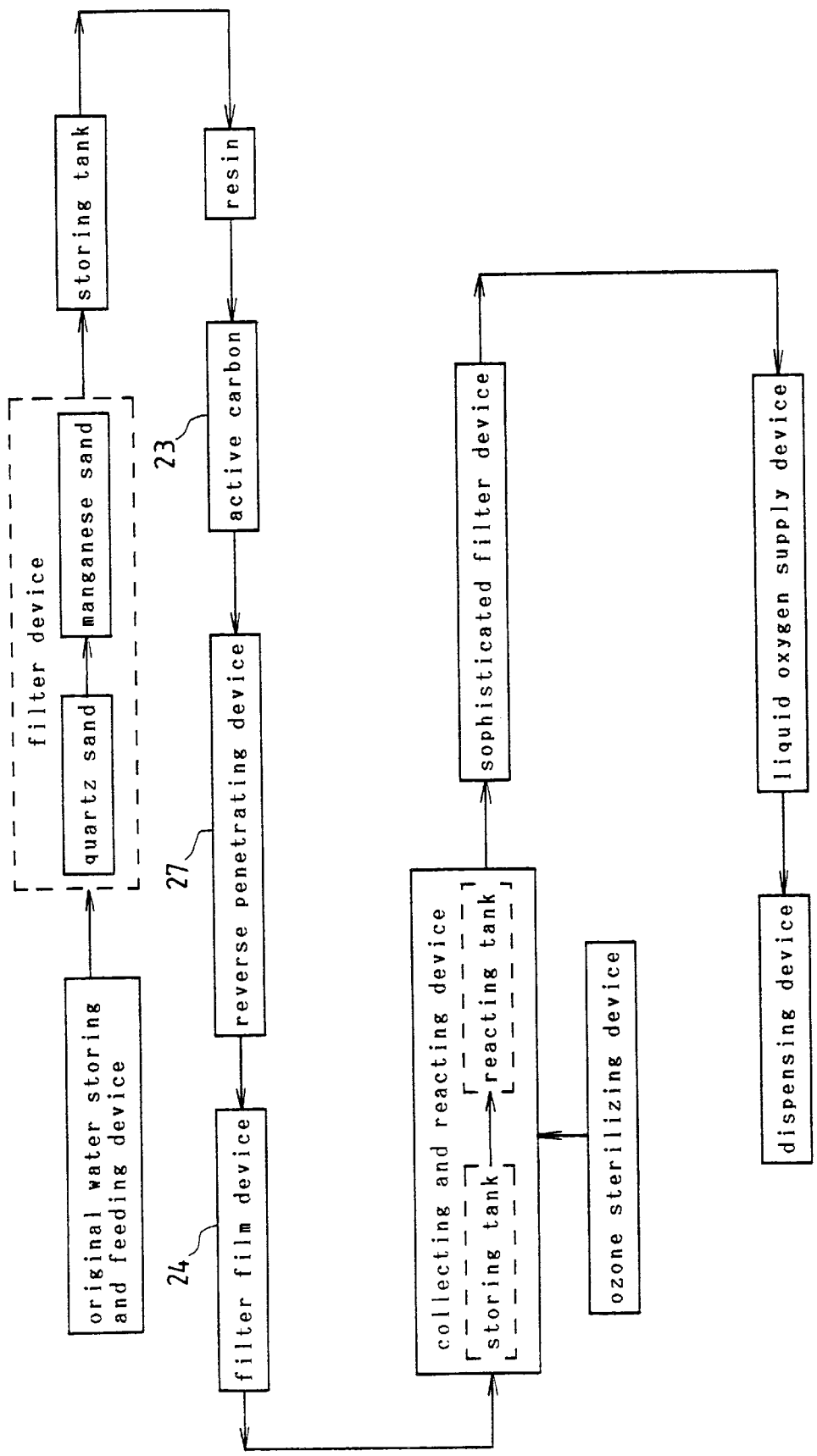
FIG. 4 is a flow chart of a second embodiment of manufacturing equipment for drinkable water containing high oxygen in the present invention; and, FIG. 5 is a perspective view of a pentrating film device in the present invention.

Next, FIG. 4 shows a second embodiment of manufacturing equipment for drinkable water containing high oxygen in the present invention, including almost the same structure, except that a reverse penetrating film device 27 is additionally provided between the deodorising device 23 and the film filter device 24, for removing more organic, inorganic or harmful substances to a human body.

Figure 5:
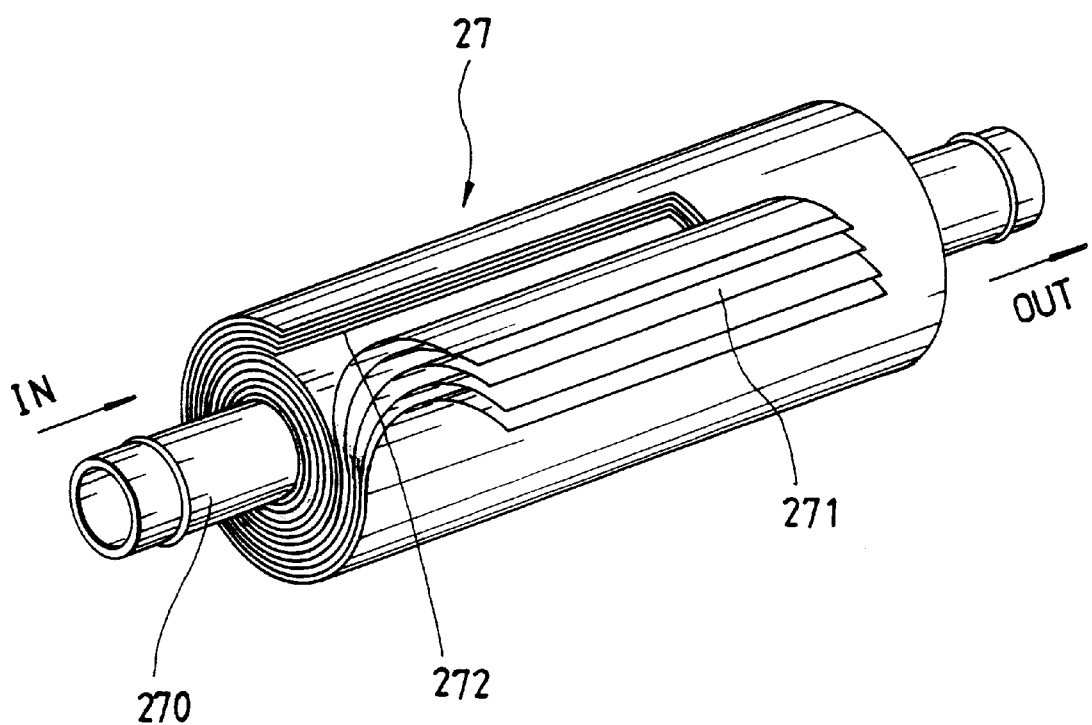

The reverse penetrating film device 27 has a structure shown in FIG. 5, including a reverse flow tube 270 in the center portion, a reverse penetrating film supporting layer 271 formed in an outer layer portion, and a reverse penetrating layer 272 formed inside the reverse penetrating film supporting layer 271. Water coming from the previous device enters the reverse penetrating film device 27, flowing through the reverse film layer 272 in order for the organic, the inorganic or harmful substances to a human body to be gradually removed. Water not yet completely treated will be made to flow back through the reverse flow tube 270 to be treated again.

While the preferred embodiments of the invention have been described above, it will be recognized and understood that various modifications may be made therein and the appended claims are intended to cover all such modifications which may fall within the spirit and scope of the invention.

What is claimed is:

1. A manufacturing system for purifying untreated water into drinkable water containing high oxygen comprising:

an untreated water storing and feeding device;

a filter device connected downstream of said untreated water storing and feeding device, the filter device having filter material made of sand for filtering dirt, calcium, iron, or other heavy metals;

a softening device connected downstream of said filter device and containing resin for softening the water;

a deodorising device connected downstream of said softening device and containing active carbon for removing odor from the water;

a film filter device connected downstream of said deodorising device and containing filter films provided with a plurality of holes having diameters of between 10 and 200 angstroms, for removing, by means of capillarity, organic substances;

a collecting and reacting device connected downstream of said film filter device for collecting water coming from the film filter device, the collecting and reacting device having an inner temperature in the range of 0° C.–30° C.;

an ozone sterilizing device connected to said collecting and reacting device, so as to fill ozone into water in said collecting and reacting device, the ozone sterilizing the water over a predetermined period of time;

a sophisticated filter device connected downstream of said water collecting and reacting device and having filter films with a plurality of pores with diameters of approximately 100 angstrom to further remove, by means of capillarity organic substances from the water, said filter films comprising filter material having anti-corrosive properties;

a liquid oxygen supply device connected downstream of said sophisticated filter device to enhance the oxygen contained in the water coming from said sophisticated filter device; and, a dispensing device connected downstream of said liquid oxygen supply device to dispense drinkable water.

2. The manufacturing system for drinkable water containing high oxygen as claimed in claim 1, further comprising a reverse penetrating film device connected between said deodorising device and said film filter device for removing from the water organic, inorganic and substances harmful to a human body.

* * * * *